(12) United States Patent
Svendsen

(10) Patent No.: US 9,141,825 B2
(45) Date of Patent: Sep. 22, 2015

(54) SYSTEM AND METHOD FOR CONTROLLING ACCESS TO ASSETS IN A NETWORK-BASED MEDIA SHARING SYSTEM USING TAGGING

(75) Inventor: Hugh Svendsen, Chapel Hill, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1615 days.

(21) Appl. No.: 11/282,431

(22) Filed: Nov. 18, 2005

(65) Prior Publication Data

US 2007/0118525 A1    May 24, 2007

(51) Int. Cl.
*G06F 21/10* (2013.01)
*G06F 21/62* (2013.01)
*G06F 17/30* (2006.01)
*H04L 29/08* (2006.01)

(52) U.S. Cl.
CPC ........ *G06F 21/6245* (2013.01); *G06F 17/3028* (2013.01); *G06F 17/30265* (2013.01); *G06F 21/6218* (2013.01); *H04L 67/1063* (2013.01); *H04L 67/06* (2013.01); *H04L 67/104* (2013.01)

(58) Field of Classification Search
USPC ............................................ 726/26; 713/182
See application file for complete search history.

(56) References Cited

U.S. PATENT DOCUMENTS

| | | | |
|---|---|---|---|
| 5,760,917 A | 6/1998 | Sheridan ........................ 358/442 |
| 6,016,478 A | 1/2000 | Zhang et al. |
| 6,301,586 B1 | 10/2001 | Yang et al. ..................... 707/104 |
| 6,314,408 B1 | 11/2001 | Salas et al. ....................... 705/54 |
| 6,574,629 B1 | 6/2003 | Cooke, Jr. et al. .............. 707/10 |
| 6,578,072 B2 | 6/2003 | Watanabe et al. ............. 709/217 |
| 6,583,799 B1 | 6/2003 | Manolis et al. |
| 6,629,100 B2 | 9/2003 | Morris et al. .................... 707/10 |
| 6,629,104 B1 | 9/2003 | Parulski et al. ................ 707/102 |
| 6,636,259 B1 | 10/2003 | Anderson et al. .......... 348/211.3 |
| 6,671,424 B1 | 12/2003 | Skoll et al. ..................... 382/305 |
| 6,675,205 B2 | 1/2004 | Meadway et al. |
| 6,757,684 B2 | 6/2004 | Svendsen et al. ............... 707/10 |
| 6,804,684 B2 | 10/2004 | Stubler et al. .............. 707/104.1 |
| 6,839,721 B2 | 1/2005 | Schwols |
| 6,857,053 B2 | 2/2005 | Bolik et al. |
| 6,871,231 B2 | 3/2005 | Morris .......................... 709/225 |
| 6,904,160 B2 | 6/2005 | Burgess ........................ 382/113 |
| 6,947,959 B1 | 9/2005 | Gill |
| 6,976,028 B2 | 12/2005 | Fenton et al. |
| 6,976,090 B2 | 12/2005 | Ben-Shaul et al. |
| 7,117,453 B2 | 10/2006 | Drucker et al. |
| 7,224,777 B1 * | 5/2007 | Tannenbaum ............. 379/88.23 |
| 7,263,562 B2 | 8/2007 | DeVorchik et al. |
| 2002/0087546 A1 | 7/2002 | Slater et al. .................... 707/10 |

(Continued)

OTHER PUBLICATIONS

International Search Report for PCT/US06/60759 mailed Feb. 7, 2008.

*Primary Examiner* — Christopher Brown
(74) *Attorney, Agent, or Firm* — Withrow & Terranova, PLLC

(57) ABSTRACT

A system and method for controlling access to digital assets in an online media sharing system based on keywords are provided. In general, each digital asset is tagged with a number of keywords. The owner of the digital assets defines a guest list including a number of guests. For each guest, the owner defines permissions controlling the guest's access to the digital assets based on keywords. Thereafter, when a request to view the digital assets is received from a guest node associated with one of the guests, the digital assets that the guest is permitted to view are identified based on the permissions assigned to the guest and provided to the guest at the guest node.

18 Claims, 10 Drawing Sheets

(56) References Cited

U.S. PATENT DOCUMENTS

| | | |
|---|---|---|
| 2002/0188602 A1 | 12/2002 | Stubler et al. ............... 707/3 |
| 2003/0018802 A1 | 1/2003 | Romanik et al. |
| 2003/0052897 A1* | 3/2003 | Lin ............................ 345/619 |
| 2003/0074373 A1 | 4/2003 | Kaburagi et al. .......... 707/104.1 |
| 2003/0131002 A1 | 7/2003 | Gennetten et al. .............. 707/10 |
| 2003/0172297 A1 | 9/2003 | Gunter |
| 2004/0024739 A1 | 2/2004 | Copperman et al. |
| 2004/0103203 A1 | 5/2004 | Nichols et al. |
| 2004/0107125 A1 | 6/2004 | Guheen et al. |
| 2004/0111415 A1 | 6/2004 | Scardino et al. ............... 707/10 |
| 2004/0139172 A1 | 7/2004 | Svendsen et al. |
| 2004/0145660 A1 | 7/2004 | Kusaka |
| 2004/0172451 A1 | 9/2004 | Biggs et al. ................ 709/206 |
| 2004/0201692 A1 | 10/2004 | Parulski et al. ............ 348/207.1 |
| 2004/0230663 A1 | 11/2004 | Ackerman .................. 709/207 |
| 2004/0260679 A1 | 12/2004 | Best et al. |
| 2005/0015389 A1 | 1/2005 | Novak et al. |
| 2005/0044483 A1 | 2/2005 | Maze et al. ................ 715/501.1 |
| 2005/0052685 A1 | 3/2005 | Herf et al. |
| 2005/0060299 A1 | 3/2005 | Filley et al. ..................... 707/3 |
| 2005/0060356 A1 | 3/2005 | Saika |
| 2005/0091289 A1 | 4/2005 | Shappell et al. |
| 2005/0097173 A1 | 5/2005 | Johns et al. .................. 709/206 |
| 2005/0131871 A1 | 6/2005 | Howard et al. |
| 2005/0190273 A1* | 9/2005 | Toyama et al. ............ 348/231.5 |
| 2005/0229243 A1 | 10/2005 | Svendsen et al. |
| 2005/0273476 A1 | 12/2005 | Wertheimer et al. |
| 2006/0085490 A1 | 4/2006 | Baron et al. |
| 2006/0170669 A1* | 8/2006 | Walker et al. ................. 345/418 |
| 2006/0218148 A1* | 9/2006 | Weber et al. ..................... 707/9 |
| 2006/0253434 A1 | 11/2006 | Beriker et al. |
| 2007/0016575 A1 | 1/2007 | Hurst-Hiller et al. |
| 2007/0073694 A1* | 3/2007 | Picault et al. .................... 707/9 |
| 2007/0168463 A1 | 7/2007 | Rothschild et al. |
| 2007/0226811 A1* | 9/2007 | Kamperman et al. ........... 726/30 |

* cited by examiner

|  | WORK | FAMILY | KIDS SPORTING EVENTS | VACATION | WILD PARTIES | FRIENDS | CAMERA PHONE | SPRING | SUMMER | FALL | WINTER | WEEKDAY | WEEKEND | HOT WEATHER | MODERATE WEATHER | COLD WEATHER |
|---|---|---|---|---|---|---|---|---|---|---|---|---|---|---|---|---|
| JOHN | X |  | X |  | X |  | X | X | X | X | X |  |  |  |  |  |
| SUE | X | X | X |  |  | X |  |  |  |  |  |  |  |  |  |  |
| MOM | X |  | X |  |  |  |  |  |  |  |  |  |  | X | X | X |
| GEORGE | X |  | X | X | X | X |  |  |  |  |  | X | X |  |  |  |
| BILL |  | X | X |  |  |  |  |  |  |  |  |  |  |  |  |  |

STATIC KEYWORDS (48) — DYNAMIC KEYWORDS (50) — (46) names — (52)

FIG. 5

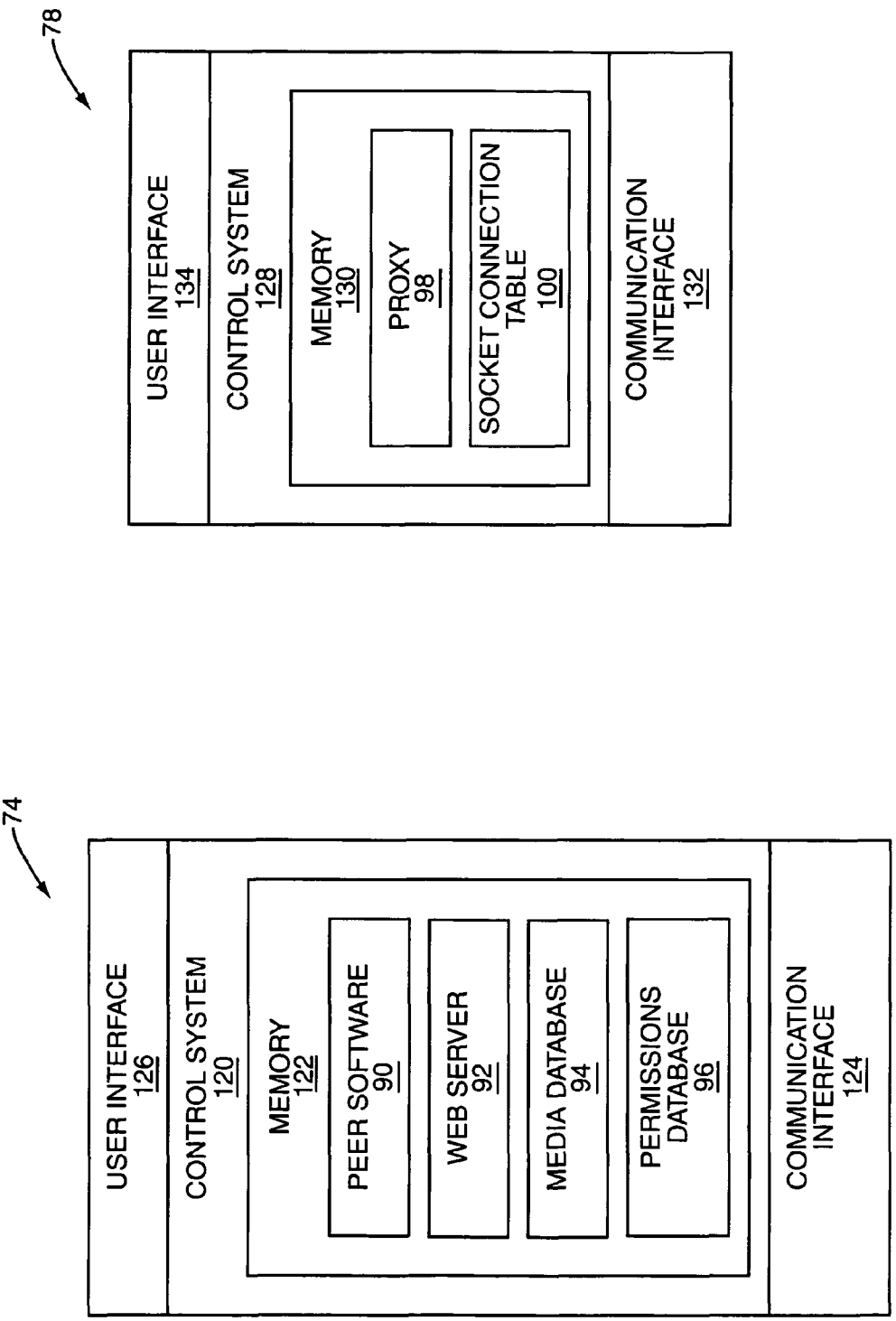

SYSTEM AND METHOD FOR CONTROLLING ACCESS TO ASSETS IN A NETWORK-BASED MEDIA SHARING SYSTEM USING TAGGING

FIELD OF THE INVENTION

The present invention relates to online media sharing systems and more specifically relates to controlling access to digital assets based on keywords used to tag the digital assets.

BACKGROUND OF THE INVENTION

With the proliferation of digital cameras, numerous online photosharing services have emerged and are becoming widely accepted by photo enthusiasts. The photosharing services are generally based on one of two architectures. The first is a centrally hosted architecture where a central server hosts digital images for a number of users and provides photosharing services by serving the digital images to a web browser of a user or guest. The second is a peer-to-peer (P2P) architecture where a user creates and stores photo albums on the user's computer. The user's computer then operates as a web server to provide the photo albums to the web browser of another user or guest.

One issue with online photosharing services is controlling access to photo albums. Typical online photosharing systems control access on a per image basis or a per album basis. Each image or photo album may be classified as private such that it is not shared or as public such that it is shared with all guests. Some systems allow the owner of the image or photo album to define a list of permitted guests for each digital image or photo album. However, these systems do not take advantage of keywords used by an owner to tag digital assets. Thus, there remains a need for a system and method of controlling access to digital assets in an online media sharing system based on keywords used to tag the digital assets.

SUMMARY OF THE INVENTION

The present invention relates to a system and method for controlling access to digital assets in an online media sharing system based on keywords. In general, each digital asset is tagged with a number of keywords. The owner of the digital assets defines a guest list including a number of guests. For each guest, the owner defines permissions controlling the guest's access to the digital assets based on keywords. Thereafter, when a request to view the digital assets is received from a guest node associated with one of the guests, the digital assets that the guest is permitted to view are identified based on the permissions assigned to the guest and provided to the guest at the guest node.

In one embodiment, for each guest in the guest list, the owner selects keywords to be associated with the guest. As a result, the guest is permitted to view the digital assets tagged with the selected keywords. In another embodiment, the owner may define a keyword equation for each guest. The guest is then permitted to view the digital assets satisfying the keyword equation assigned to the guest.

In one embodiment, the keywords used to tag the digital assets are static keywords. In another embodiment, the keywords used to tag the digital assets may include one or more dynamic keywords that are evaluated when a request to view the digital assets is received from the guest.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification Illustrate several aspects of the invention, and together with the description serve to explain the principles of the invention.

FIG. 5 is an exemplary user interface for assigning permissions to each guest on a guest list based on keywords used to tag digital assets according to one embodiment of the present invention;

FIG. 10 is a block diagram of an exemplary embodiment of the peer node of the system of FIG. 7; and FIG. 11 is a block diagram of an exemplary embodiment of the central node of the system of FIG. 7.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for controlling access to digital assets in an online media sharing system based on keywords. In general, each digital asset is tagged with a number of keywords. The owner of the digital assets defines a guest list including a number of guests. For each guest, the owner defines permissions controlling the guest's access to the digital assets based on keywords. Thereafter, when a request to view the digital assets is received from a guest node associated with one of the guests, the digital assets that the guest is permitted to view are identified based on the permissions assigned to the guest and provided to the guest at the guest node.

Figure 1:
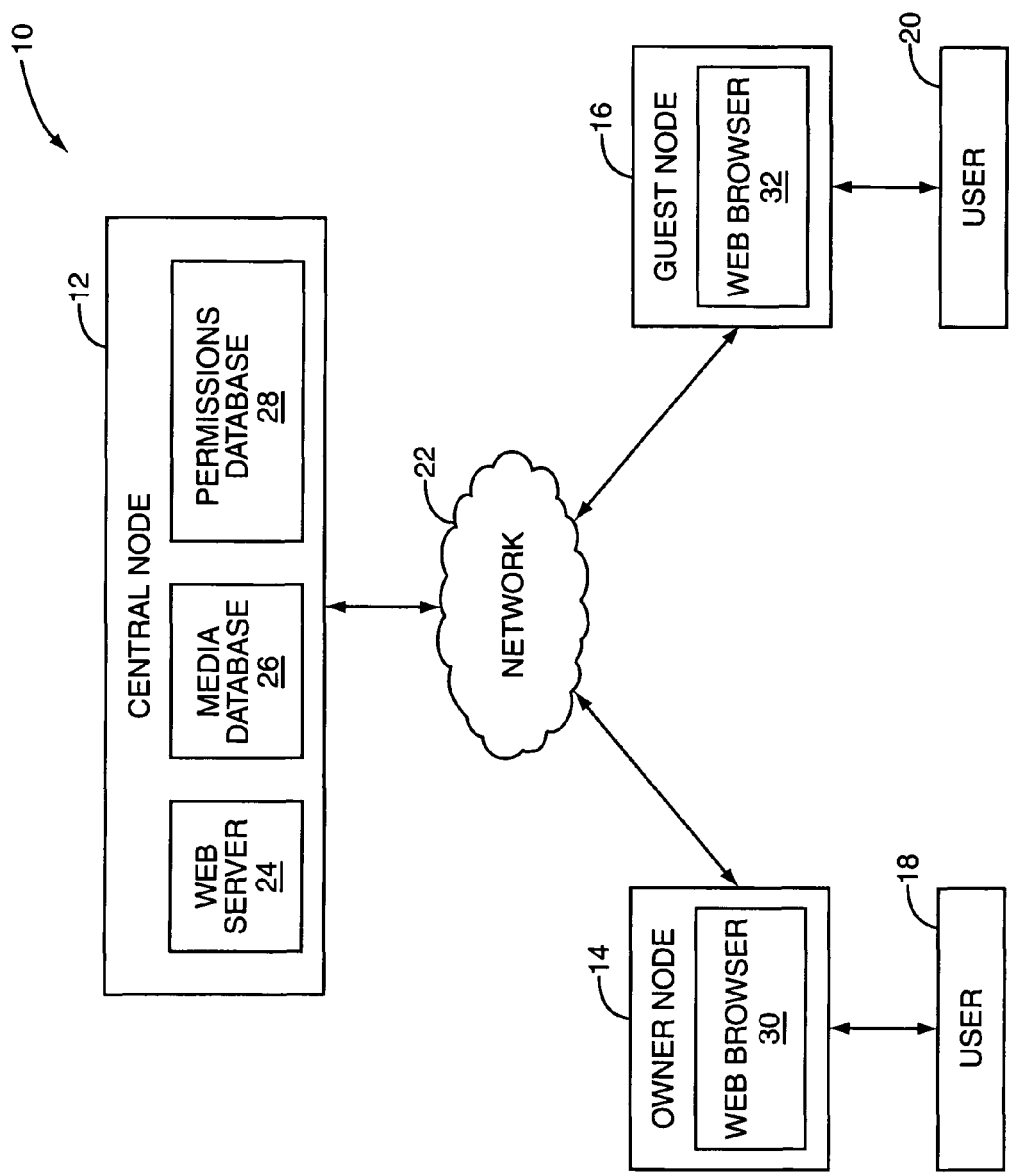
FIG. 1 illustrates an exemplary centrally hosted media sharing system controlling access to digital assets based on keywords used to tag the digital assets according to one embodiment of the present invention.

In one embodiment, the present invention is implemented in a centrally hosted photosharing system. An exemplary centrally hosted photosharing system 10 is illustrated in FIG. 1 and includes a central node 12, an owner node 14, a guest node 16, users 18 and 20, and a network 22. Preferably, the network 22 is the Internet. There may be any number of owner nodes 14 and guest nodes 16.

In general, the central node 12 includes a web server 24, a media database 26, and a permissions database 28. The web server 24 may be implemented in hardware, software, or a combination thereof. The media database 26 and the permissions database 28 may be stored in memory such as Random Access Memory (RAM) or some other storage device such as a hard disc drive. The media database 26 stores digital assets for each of a number of owners such as the user 18 at the owner node 14. The digital assets may be photo albums, digital images, digital videos, or the like. While the discussion herein focuses on photo albums, it should be recognized that the present invention is equally applicable to any digital asset.

The permissions database 28 stores permissions for a number of guests, such as the user 20 at the guest node 16, defining the digital assets that the guests are permitted to view based on keywords used to tag the digital assets. For example, the user 20 at the guest node 16 may be permitted to view the photo albums owned by the user 18 and stored at the central node 12 that are tagged with the keywords "Family" or "Vacation." In addition, the permissions may define the digital assets that the guests are permitted to print, copy, e-mail, download, and the like.

The owner and guest nodes 14 and 16 may be personal computers, mobile terminals, Personal Digital Assistants, or the like and have access to the network 22. As illustrated, the owner node 14 includes a web browser 30, and the guest node 16 includes a web browser 32. The user 18 may be referred to herein as an owner, and the user 20 may be referred to herein as a guest.

In operation, when the user 18 desires to share a number of photo albums, the user 18 interacts with the central node 12 using the web browser 30 to upload and share the photo albums. More specifically, the user 18 directs with the web browser 30 to a webpage or website operating as a user interface for the central node 12. The user 18 may then interact with the central node 12 to upload the photo albums from the owner node 14 to the central node 12. The photo albums or the digital images within the photo albums are tagged with one or more keywords either before being uploaded to the central node 12 or after being uploaded to the central node 12.

The user 18 may further interact with the central node 12 to define a guest list and permissions for each guest in the guest list based on the keywords used to tag either the photo albums or the digital images within the photo albums. For each of the guests, the permissions may be defined by selecting one or more keywords, wherein the guest is permitted to view the ones of the photo albums or the digital images within the photo albums tagged with the selected keywords. Alternatively, the permissions may be assigned to each guest based on a keyword equation such that the guest is permitted to view the photo albums or digital images tagged with keywords satisfying the keyword equation. In a similar fashion, the permissions may define the photo albums or digital images that the guests are permitted to copy, print, e-mail, and the like.

After the guest list and the permissions are defined, the central node 12 may send an invitation to each of the guests. Using a web link and optionally a username and/or password provided in the invitation, the guest is permitted to view the photo albums or digital images tagged with the keywords defined by his or her permissions. For example, the user 20 may be invited by sending an e-mail invitation to the user 20 at the guest node 16 including a web link to the central node 12. The Uniform Resource Locator (URL) for the web link may include information identifying the guest or the permissions assigned to the guest. When the user 20 desires to view the photo albums, the user 20 may activate the web link or enter the associated URL in the web browser 32. In response, the central node 12 provides the photo albums or digital images tagged with the keywords defined in the permissions of the user 20 to the guest node 16.

The e-mail invitation may alternatively include a web link to the central node 12 and a username and/or password for the user 20. When the user 20 desires to view the photo albums, the user 20 may activate the web link or enter the associated Uniform Resource Locator (URL) in the web browser 32. The central node 12 may then require the user 20 to enter the username and/or password from the e-mail invitation. Based on the username and/or password, the central node 12 may determine the permissions assigned to the user 20 and enable the user 20 to view the photo albums or digital images that the user 20 is permitted to view.

Figure 2:
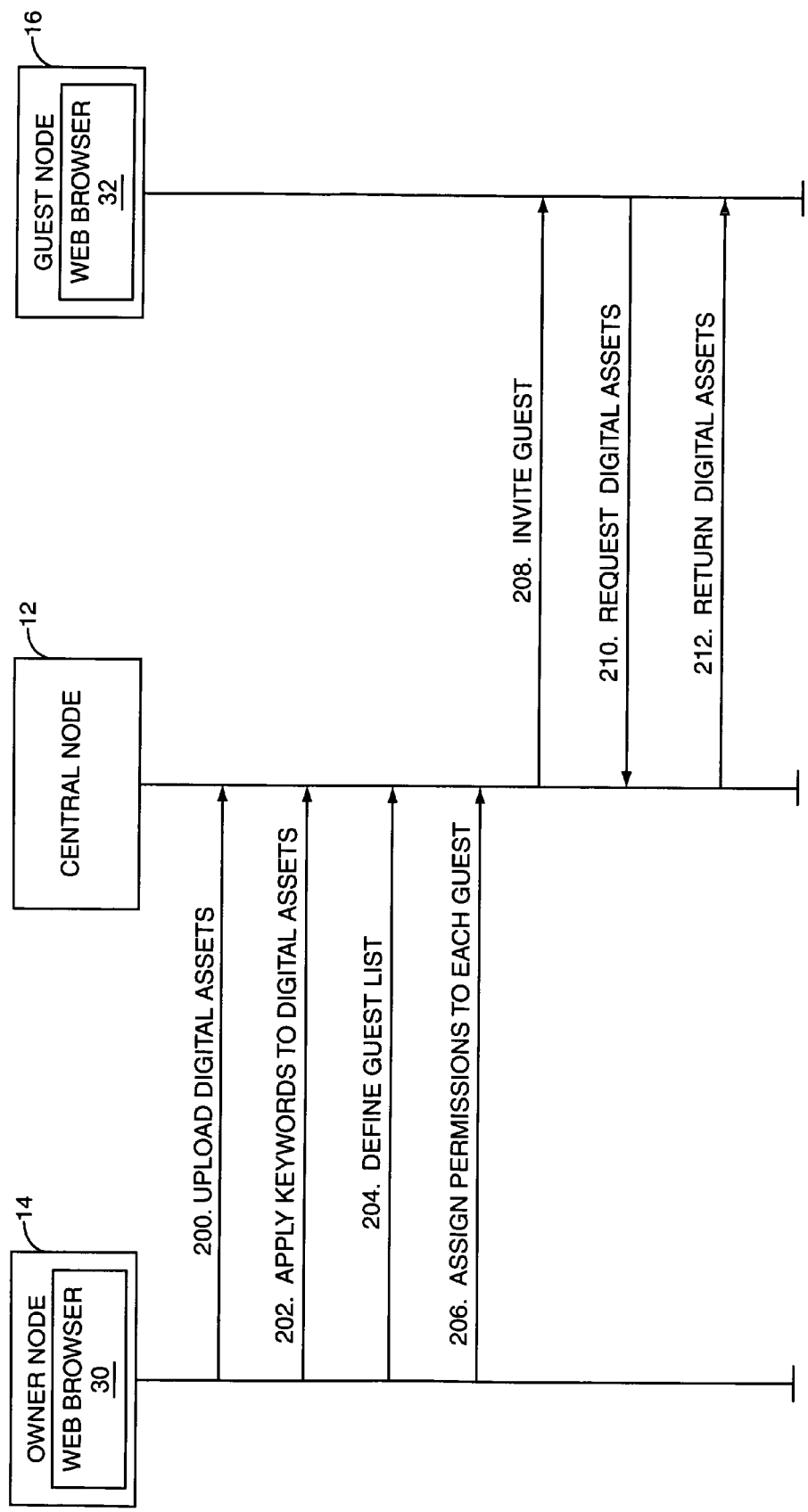
FIG. 2 illustrates the operation of the system of FIG. 1.

FIG. 2 illustrates the operation of the centrally hosted photosharing system 10 of FIG. 1. Initially, the user 18 at the owner node 14 interacts with the central node 12 using the web browser 30 such that the owner node 14 uploads a number of photo albums, or digital assets, to the central node 12 (step 200). The user 18 at the owner node 14 then interacts with the central node 12 using the web browser 30 to tag the photo albums or the digital images within the photo albums with one or more keywords (step 202). Alternatively, the user 18 may interact with the owner node 14 to tag the photo albums or the digital images within the photo albums with one or more keywords before uploading the photo albums to the central node 12.

The keywords may be static keywords or dynamic keywords. Both static and dynamic keywords are keywords that are stored in association with a photo album or a digital image. For example, if the digital images are stored in a format such as the Joint Photographic Experts Group (JPEG) format, the static and dynamic keywords may be stored as metadata within the digital image file. As another example, the static and dynamic keywords for a photo album or digital image may be stored in an application file storing keywords for a number of photo albums or digital images. Static keywords are keywords that do not change. For example, static keywords may be "Work," "Family," "Vacation," and "Friends."

Dynamic keywords are keywords having a state of "true" or "false" determined by associated software. More specifically, each dynamic keyword is associated with a software process such as a software plug-in that is invoked when it is desired to determine the state of the dynamic keyword. In one embodiment, the dynamic keywords may be evaluated each time a guest whose permissions depend upon the dynamic keyword sends a request to view the photo albums or digital images to the central node 12. Examples of dynamic keywords include, but are not limited to, "Fall," "Spring," "Summer," "Winter," "Weekday," "Weekend," "Hot Weather," "Moderate Weather," and "Cold Weather."

As an example, when it is desired to determine the state of the "Fall" dynamic keyword, an associated software process may be invoked to determine whether the current date is within a predetermined range of dates corresponding to the Fall. If so, the state of the dynamic keyword is "true" and it is as if the digital assets tagged with the dynamic keyword "Fall" are tagged with the keyword "Fall." If not, the state of the dynamic keyword is "false" and it is as if the digital assets tagged with the dynamic keyword "Fall" are not tagged with the keyword "Fall."

As another example, when it is desired to determine the state of the "Hot Weather" dynamic keyword, an associated software process may be invoked to determine whether the current outdoor temperature at either the location of the owner node 14 or the guest node 16 is above a threshold temperature. If so, the state of the keyword is "true" and it is as if the digital assets tagged with the dynamic keyword "Hot Weather" are tagged with the keyword "Hot Weather." If not, the state of the dynamic keyword is "false" and it is as if the digital assets tagged with the dynamic keyword "Hot Weather" are not tagged with the keyword "Hot Weather." As will be apparent to one of ordinary skill in the art, the outdoor temperature at the location of the owner node 14 or the guest node 16 may be determined based on the location of the owner node 14 or the guest node 16. Further, the locations of the owner and guest nodes 14 and 16 may be determined based on the Internet Protocol (IP) addresses of the owner and guest nodes 14 and 16.

After uploading and tagging the photo albums, the user 18 at the owner node 14 interacts with the central node 12 using the web browser 30 to define a guest list (step 204) and to assign permissions to each guest in the guest list (step 206). For each guest, the permissions define the photo albums or the digital images within the photo albums which the guest is permitted to view based on the keywords used to tag the photo albums or digital images. More specifically, for each guest in the guest list, the user 18 at the owner node 14 may define the permissions for the guest by selecting one or more keywords, thereby permitting the guest to view the photo albums or digital images tagged with the selected keywords. Note that if the selected keywords include a dynamic keyword, the guest is permitted to view the photo albums or digital images tagged with the dynamic keyword if the state of the dynamic keyword is determined to be "true" when the guest sends the request to view the photo albums or digital images. Alternatively, the permissions for the guests may be defined based on keyword equations, wherein each guest is permitted to view the photo albums or digital images tagged with keywords satisfying the keyword equation assigned to the guest. Permissions may be defined for a number of functions such as, but not limited to, viewing, printing, copying, e-mailing, and downloading.

After defining the guest list and the permissions for the guests, the central node 12 may send invitations to the guests. In this example, the user 20 at the guest node 16 is one of the guests in the guest list. Thus, the central node 12 sends an invitation to the guest node 16 (step 208). After receiving the invitation, the user 20 at the guest node 16 directs the web browser 32 to request the photo albums from the central node 12 (step 210). In response, the central node 12 returns the photo albums or digital images that the user 20 is permitted to view to the guest node 16 (step 212). Note that if the permissions of the user 20 depend upon one or more dynamic keywords, the central node 12 evaluates the dynamic keywords and determines the photo albums or digital images that the user 20 is permitted to view based on the state of the dynamic keywords.

The invitation sent to the user 20 at the guest node 14 may be an e-mail invitation wherein the e-mail address of the user 20 is provided by the user 18 when defining the guest list. In one embodiment, the e-mail invitation may include a web link to the central node 12. The web link may include information identifying the user 20 at the guest node 16 or the permissions assigned to the user 20 at the guest node 16. When the user 20 at the guest node 16 activates the web link, the web browser 32 sends a request to the central node 12 including the information identifying the user 20 at the guest node 16 or the permissions assigned to the user 20 at the guest node 16. Using this information, the central node 12 may determine the permissions assigned to the user 20, identify the photo albums or digital images the user 20 is permitted to view based on the permissions assigned to the user 20, and provide the photo albums or digital images that the user 20 is permitted to view to the guest node 16. If the permissions of the user 20 are based, at least in part, on one or more dynamic keywords, identifying the photo albums or digital images that the user 20 is permitted to view includes evaluating the state of the dynamic keywords.

Alternatively, the e-mail invitation may include a web link to a log-in webpage at the central node 12 and a username and/or password for the user 20. When the user 20 at the guest node 16 activates the web link, the web browser 32 sends a request for the log-in webpage to the central node 12. In response, the central node 12 returns the log-in webpage to the guest node 16. The user 20 then enters the username and/or password, which are then provided to the central node 12. Based on the username and/or password, the central node 12 may determine the permissions assigned to the user 20, identify the photo albums or digital images that the user 20 is permitted to view, and provide the photo albums or digital images that the user 20 is permitted to view to the guest node 16. If the permissions of the user 20 are based, at least in part, on one or more dynamic keywords, identifying the photo albums or digital images that the user 20 is permitted to view includes evaluating the state of the dynamic keywords.

Figure 3:
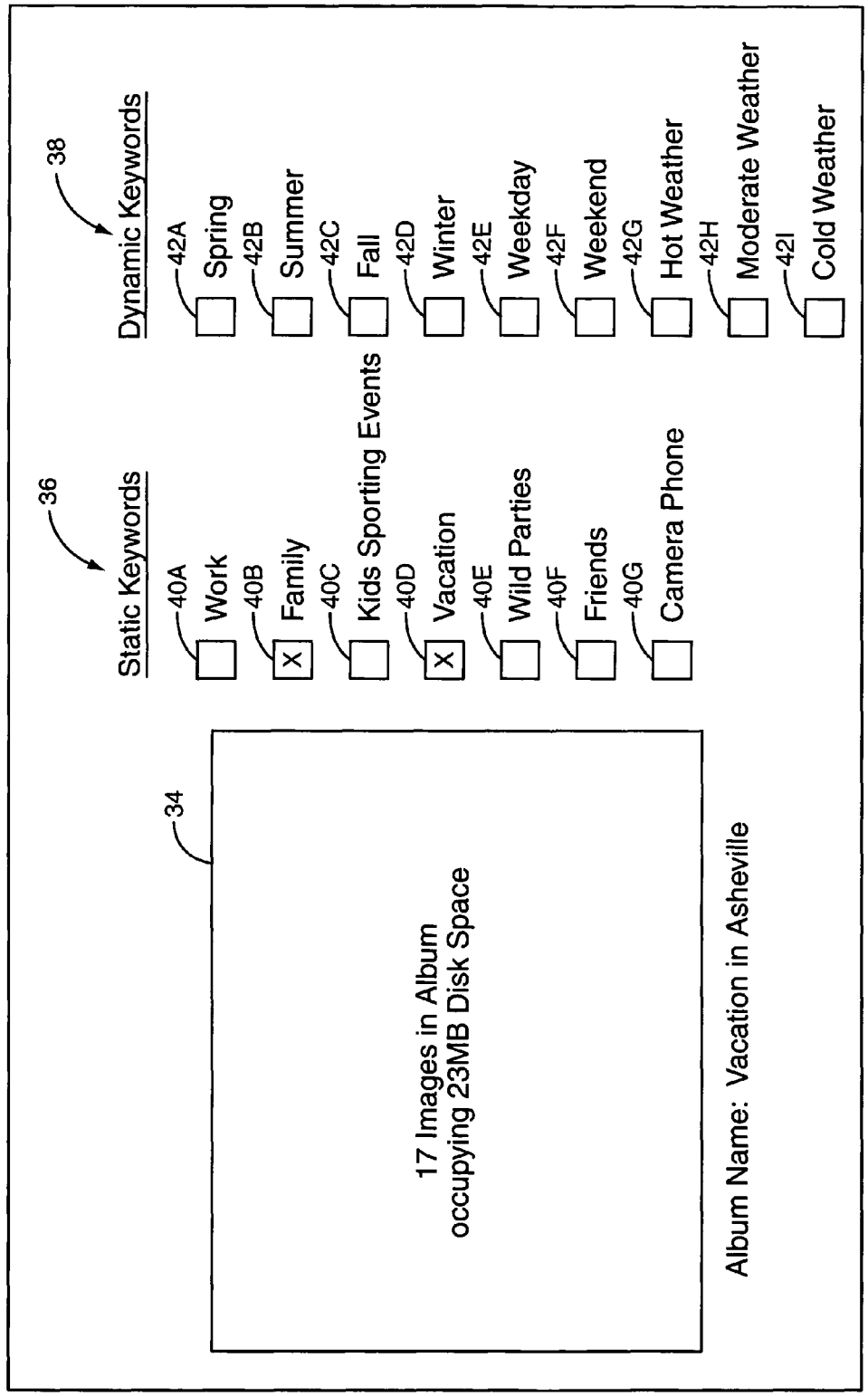
FIG. 3 is an exemplary user interface for tagging a photo album with one or more keywords according to one embodiment of the present invention.

FIG. 3 illustrates an exemplary user interface for tagging a photo album 34 with one or more keywords. The keywords used to tag the photo album 34 may be static keywords selected from a list of static keywords 36 or dynamic keywords selected from a list of dynamic keywords 38. It should be noted that both static and dynamic keywords are not necessary for the present invention. The present invention may be implemented with only static keywords, only dynamic keywords, or a combination of static and dynamic keywords. Further, the lists of static and dynamic keywords 36 and 38 are exemplary. The user 18 may define any number of static and dynamic keywords.

As illustrated, the name of the photo album 34 is "Vacation in Asheville." The lists of static and dynamic keywords 36 and 38 are displayed to the user 18, and the user 18 selects one or more keywords from the lists of static and dynamic keywords 36 and 38 to be associated with the photo album 34. The user 18 may select keywords from the lists of static and dynamic keywords 36 and 38 by, for example, checking one or more checkboxes 40A-40G and 42A-I next to the desired keywords. In this example, checkboxes 40B and 40D associated with the keywords "Family" and "Vacation" are checked, thereby selecting these keywords. Thereafter, the selected keywords are associated with the photo album 34 by, for example, storing the selected keywords in association with the photo album 34 in an application file or in metadata associated with the digital images within the photo album 34.

Figure 4:
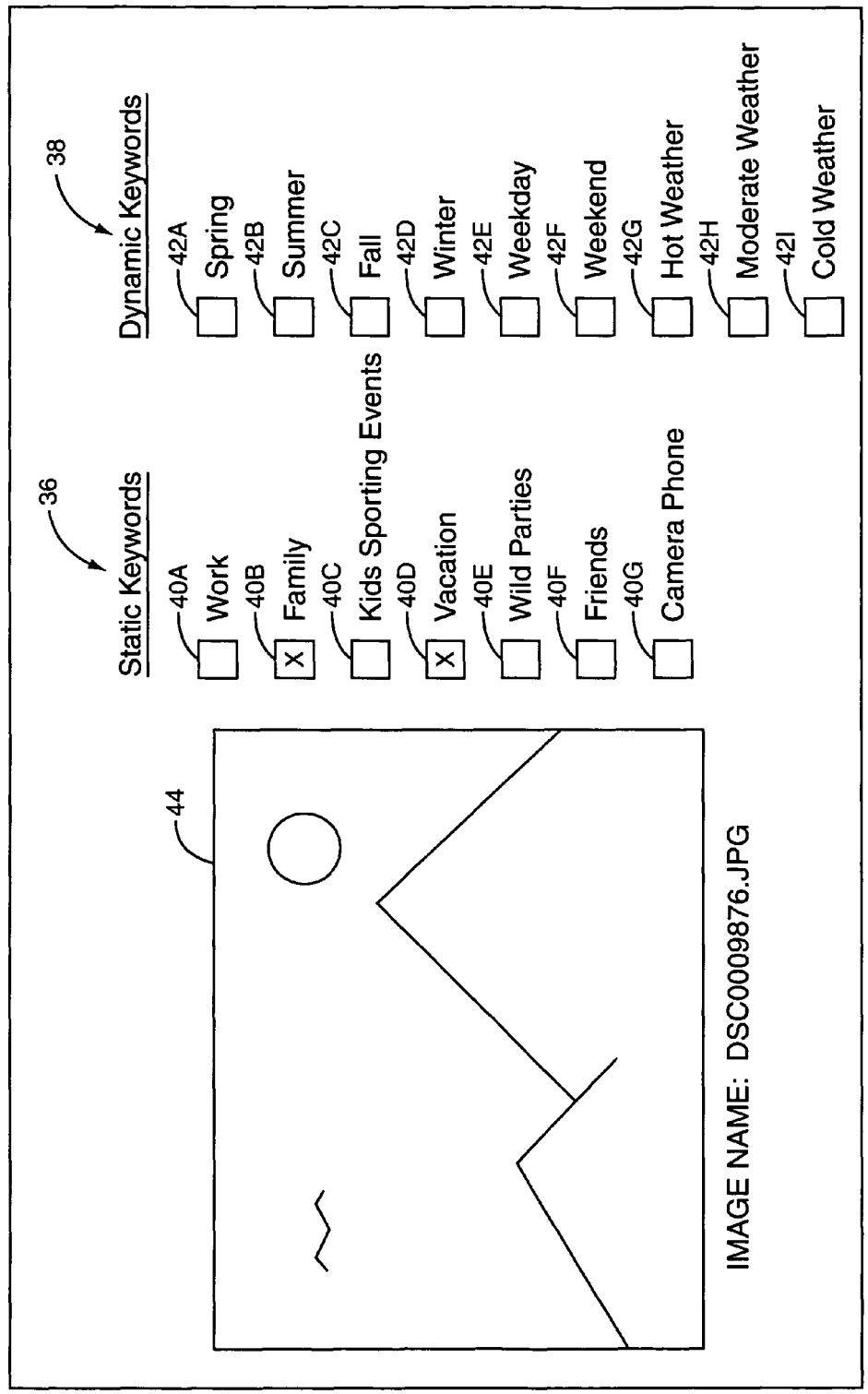
FIG. 4 is an exemplary user interface for tagging a digital image with one or more keywords according to one embodiment of the present invention.

FIG. 4 illustrates an exemplary user interface for tagging a digital image 44 within a photo album at an asset level with one or more keywords. In this example, the digital image 44 is displayed to the user 18 along with the list of static keywords 36 and the list of dynamic keywords 38. Again, both static and dynamic keywords are not necessary for the present invention. The present invention may be implemented with only static keywords, only dynamic keywords, or a combination of static and dynamic keywords. The user 18 may select keywords from the lists of static and dynamic keywords 36 and 38 by, for example, checking checkboxes 40A-40G and 42A-I next to the desired keywords. In this example, the checkboxes 40B and 40D associated with the keywords "Family" and "Vacation" are checked, thereby selecting these keywords. Thereafter, the selected keywords are associated with the digital image 44 by, for example, storing the selected keywords in metadata associated with the digital image 44 or in association with the digital image 44 in an application file.

FIG. 5 illustrates an exemplary user interface for assigning permissions to each guest in a guest list based on keywords according to one embodiment of the present invention. In general, the user interface includes a guest list 46, a list of static keywords 48, a list of dynamic keywords 50, and a permission table 52 enabling selection of one or more of the keywords from the lists of static and dynamic keywords 48 and 50 for each of the guests in the guest list 46. For each guest in the guest list 46, the user 18 at the owner node 14 interacts with the central node 12 to select one or more of the keywords in the lists of static and dynamic keywords 48 and 50 such that the guest is permitted to view the photo albums or digital images tagged with the selected keywords. Thus, in this example, the guest "John" is permitted to view photo albums or digital images tagged with one or more of the static keywords "Work," "Kids Sporting Events," "Wild Parties," and "Camera Phone" and the dynamic keywords "Spring," "Summer," "Fall," and "Winter." In a similar fashion, the user 18 may define permissions for a number of functions in addition to viewing such as printing, copying, e-mailing, downloading, and the like. Once the permissions are assigned, they may be stored in the permissions database 28 at the central node 12. The user interface may also include an "any" an "all" checkbox. The "any" checkbox would permit the guest to view the photo albums or digital images tagged with any of the keywords selected for the guest. The "all" checkbox would permit the guest to view only the photo albums or digital images tagged with all of the keywords selected for the guest.

Figure 6A:
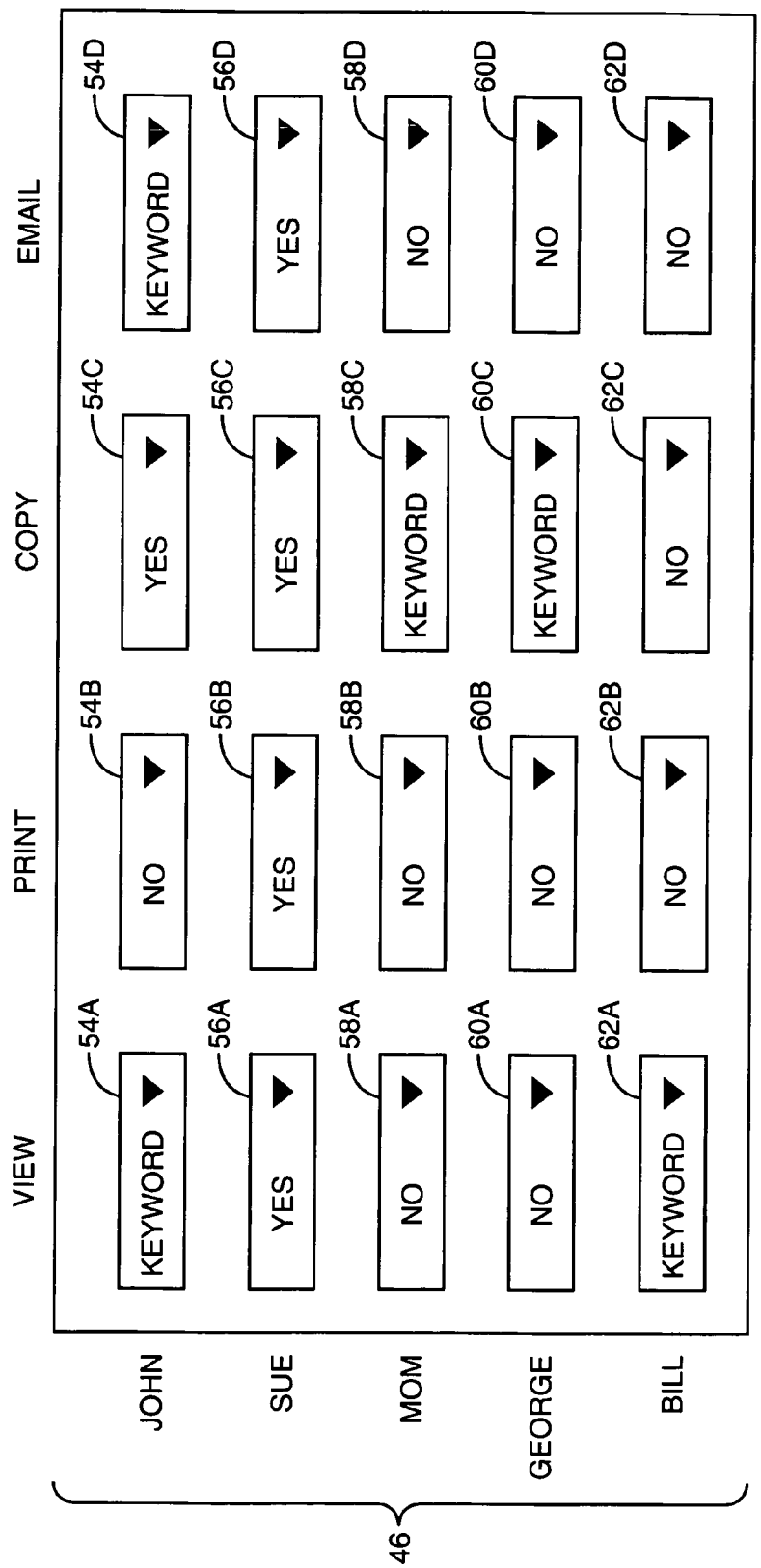
FIGS. 6A-6C illustrate an exemplary user interface for assigning permissions to each guest in a guest list based on keyword equations according to one embodiment of the present invention.
Figure 6B:
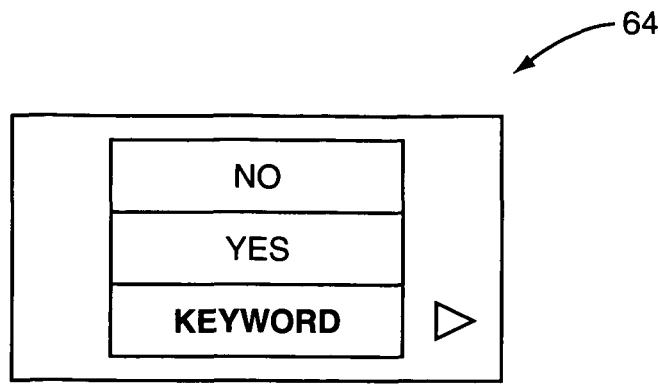
Figure 6C:
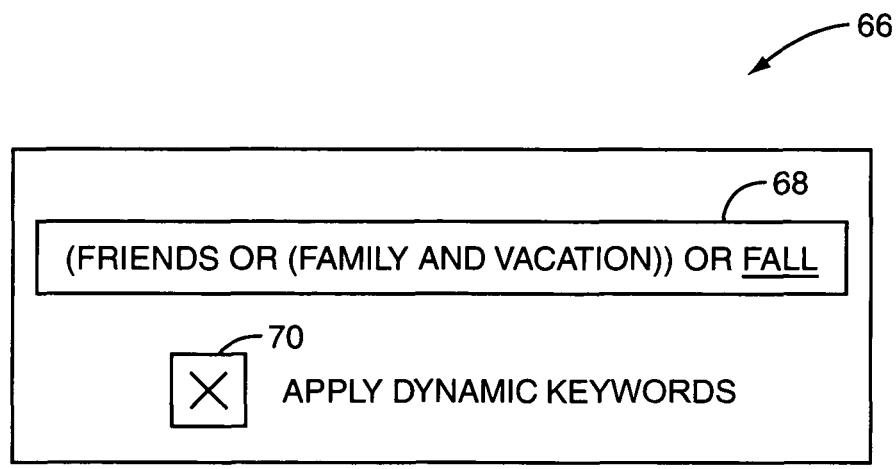

FIGS. 6A-6C illustrate an exemplary user interface for assigning permissions to guests in the guest list according to an alternative embodiment of the present invention. The permissions may be assigned to the guests based on keyword equations rather than by selecting desired keywords as described above. In general, the user interface includes the guest list 46 and a number of permissions for each of the guests. The permissions are defined for several functions for each of the guests. Namely, permissions are defined for viewing, printing, copying, and e-mailing for each of the guests. However, permissions for other functions such as downloading and the like may additionally or alternatively be provided.

For each guest and function combination, permissions may be set to either "yes," "no," or "keyword." In this example, the permissions for the guest "John" are controlled using menus 54A-54D; the permissions for the guest "Sue" are controlled using menus 56A-56D; the permissions for the guest "Mom" are controlled using menus 58A-58D; the permissions for the guest "George" are controlled using menus 60A-60D; and the permissions for the guest "Bill" are controlled using menus 62A-62D. "Yes" indicates that the guest has permission to perform the particular function for all photo albums or digital images regardless of the keywords used to tag the photo albums or digital images. Likewise, "no" means that the guest does not have permission to perform the particular function for any of the photo albums or digital images. "Keyword" indicates that the permissions for the guest for the particular function are defined by a keyword equation.

Upon selecting one of the menus 54A-54D, 56A-56D, 58A-58D, 60A-60D, or 62A-62D, a secondary menu 64 such as that illustrated in FIG. 6B is provided. The secondary menu 64 enables the user 18 to select either "yes," "no," or "keyword" for the particular guest and function combination. If the user 18 selects "keyword," then the user 18 is enabled to enter a desired keyword equation for the particular guest and function combination. For example, the user 18 may be provided with a keyword equation entry form 66 such as that illustrated in FIG. 6C. Using the keyword equation entry form 66, the user 18 may enter a desired keyword equation 68 defining the permissions for the particular keyword and function combination. In this example, the keyword equation 68 is defined such that the particular guest is permitted to perform the particular function for the photo albums or digital images tagged with keywords satisfying the equation "(FRIENDS OR (FAMILY AND VACATION)) OR FALL." The underlining of "FALL" indicates that the keyword is a dynamic keyword. The keyword equation entry form 66 may also include a checkbox 70 enabling the user 18 to either apply dynamic keywords or not apply dynamic keywords. If the dynamic keywords are not applied, the dynamic keywords are treated like a static keyword.

In this example, the dynamic keywords are applied. As such, the dynamic keywords will be evaluated each time the guest desires to perform the particular function. If the keyword equation of this example defines the permissions for a guest for viewing photo albums, the keyword equation is evaluated each time the guest requests to view the photo albums. In evaluating the keyword equation, the software process or plug-in for the dynamic keyword "FALL" is invoked and returns either "true" or "false" depending on the current date. Thus, for this example, upon evaluating the keyword equation, the guest is permitted to view the photo albums or digital images tagged with keywords satisfying "FRIENDS OR (FAMILY AND VACATION)." In addition, if the dynamic keyword "FALL" is "true," then the guest is also permitted to view the photo albums or digital images tagged with the dynamic keyword "FALL."

Figure 7:
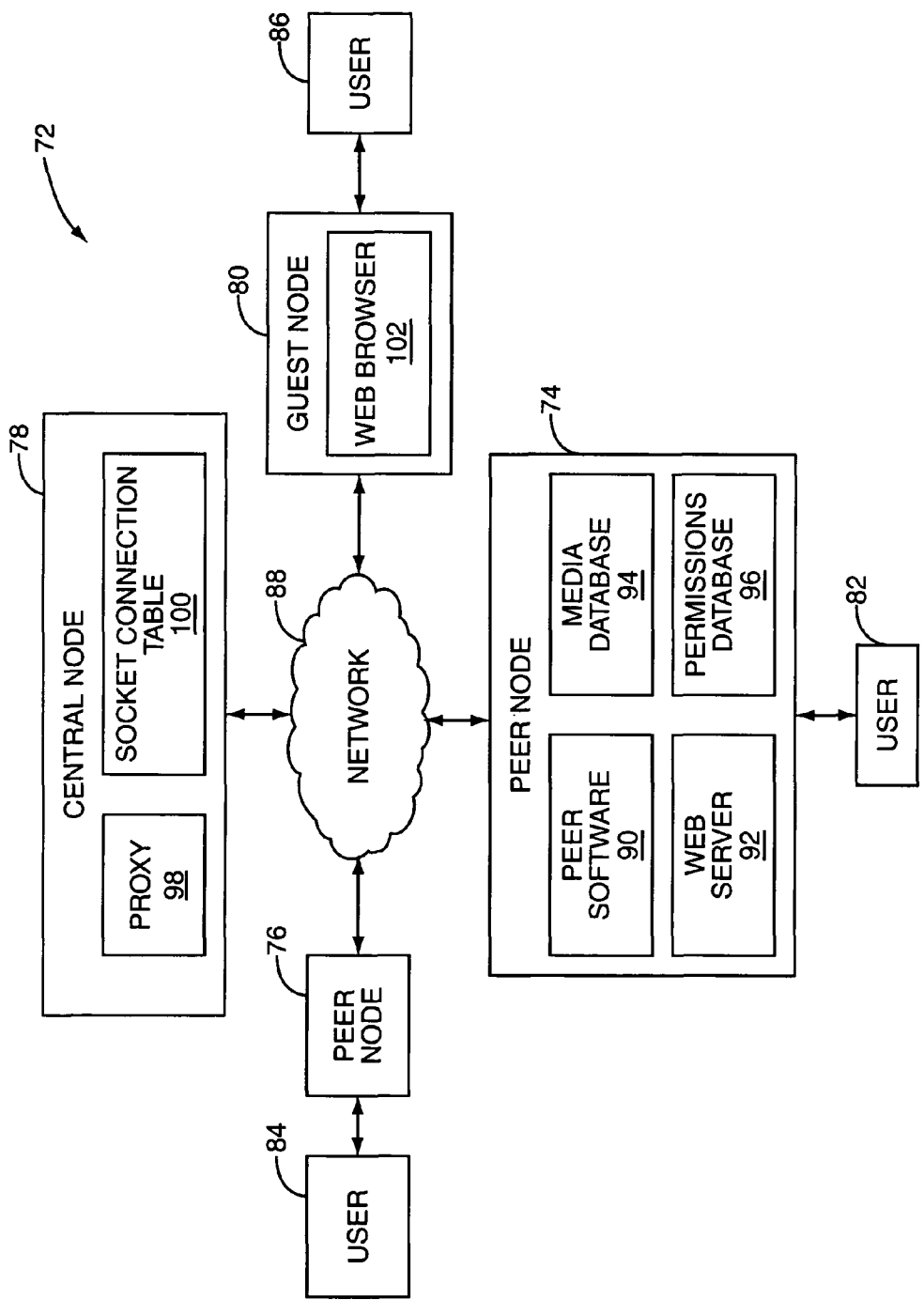
FIG. 7 illustrates an exemplary peer-to-peer (P2P) media sharing system controlling access to digital assets based on keywords used to tag the digital assets according to one embodiment of the present invention.

Although the discussion above focuses on implementing the present invention in the centrally hosted photosharing system 10 of FIG. 1, the present invention may alternatively be implemented in a peer-to-peer (P2P) photosharing system. An exemplary P2P photosharing system 72 is illustrated in FIG. 7. The P2P photosharing system 72 includes peer nodes 74 and 76, a central node 78, a guest node 80, users 82-86, and network 88. Preferably, the network 88 is the Internet. There may be any number of peer nodes 74 and 76 and guest nodes 80. The user 82 may be referred to as an owner, and the user 86 may be referred to as a guest. Details of the P2P photosharing system 72 can be found in U.S. Patent Application Publication No. 2005/0229243, entitled METHOD AND SYSTEM FOR PROVIDING WEB BROWSING THROUGH A FIREWALL IN A PEER TO PEER NETWORK, published on Oct. 13, 2005, currently pending, which is hereby incorporated by reference in its entirety.

In general, the peer nodes 74 and 76 are personal computers, mobile terminals, Personal Digital Assistants, or the like having access to the network 88. As illustrated, the peer node 74 includes peer software 90, a web server 92, a media database 94, and a permissions database 96. The peer node 74 may also include a web browser (not shown). It should be noted that the discussion herein of the peer node 74 is equally applicable to the peer node 76. The web server 92 may be implemented in hardware and/or software. The media database 94 and the permissions database 96 may be stored in memory such as Random Access Memory (RAM) or some other storage device such as a hard disc drive. The media database 94 stores digital assets such as photo albums each including a number of digital images. The permissions database 96 stores permissions for each guest in a guest list based on keywords as described above. The central node 78 includes a proxy 98 and a socket connection table 100. The guest node 80 is a personal computer, mobile terminal, Personal Digital Assistant, or the like having access to the network 88 and preferably including a web browser 102.

In operation, when the peer node 74 comes online by either connecting to the network 88 or by enabling the peer software 90, the peer node 74 establishes a socket connection with the central node 78 and more specifically with the proxy 98. The central node 78 stores information identifying the socket connection and associating the socket connection with the peer node 74 in the socket connection table 100.

The user 82 at the peer node 74 tags the photo albums or the digital images within the photo albums stored in the media database 94 with one or more keywords. As discussed above, the keywords may be static keywords, dynamic keywords, or a combination of static and dynamic keywords. The user 82 further interacts with the peer node 74 to generate a guest list and to assign permissions to each guest in the guest list based on the keywords used to tag the photo albums or digital images. More specifically, for each guest, permissions may be assigned for each of a number of functions such as viewing, printing, copying, and e-mailing by selecting one or more keywords for the guest such that the guest is permitted to perform the function on the photo albums or digital images tagged with the selected keywords. Alternatively, for each guest, a keyword equation may be defined for each of a number of functions such as viewing, printing, copying, and e-mailing, wherein the guest is permitted to perform the function on the photo albums or digital images satisfying the keyword equation.

The user 82 at the peer node 74 may then invite the user 86 at the guest node 80 to view the photo albums stored in the media database 94 by, for example, sending an e-mail invitation including a unique web link that links to the peer node 74. In addition, the e-mail invitation may include a username and/or password for the user 86. Based on information passed in the unique web link or the username and/or password, the peer software 90 may determine the permissions assigned to the user 86 and identify the photo albums or digital images that the user 86 is permitted to view based on the permissions. The e-mail invitation may be sent directly from the peer node 74 to the guest node 80 via the network 88. Alternatively, the peer node 74 may provide the guest list to the central node 78, wherein the central node 78 generates and sends the e-mail invitation.

When the user 86 at the guest node 80 desires to view the photo albums residing at the peer node 74 that he is permitted to view, the user 86 may activate that web link in the e-mail invitation. In response, the web browser 102 generates a Hypertext Transfer Protocol (HTTP) request and provides the HTTP request to the proxy 98 over the network 88. It should be noted that the HTTP request is exemplary and that the request from the guest node 80 may be implemented in any protocol desired for communication between the central node 78 and the guest node 80. The proxy 98 translates the HTTP request into a request message including one or more request packets. Using the socket connection table 100, the proxy 98 identifies the socket connection that connects the peer node 74 to the proxy 98. The proxy 98 then sends the request message to the peer node 74 via the socket connection.

In response to receiving the request message from the proxy 98, the peer node 74, and specifically the peer software 90, converts the request message into an HTTP request and provides the HTTP request to the web server 92. In one embodiment, the peer software 90 determines the permissions of the user 86 based on information passed in the HTTP request from the guest node 80, where the information may be embedded in the URL of the unique web link in the e-mail invitation. Based on the permissions assigned to the user 86, the peer software 90 may identify the photo albums or digital images that the user 86 is permitted to view and generate the HTTP request for the photo albums or digital images that the user 86 is permitted to view. In response to the HTTP request, the web server 92 generates an HTTP response including a webpage with the photo albums or digital images that the user 86 is permitted to view. The peer software 90 converts the HTTP response into a response message including one or more response packets and sends the response message to the proxy 98 via the socket connection. The proxy 98 then converts the response message from the peer node 74 into an HTTP response and sends the HTTP response to the web browser 102 at the guest node 80. Upon receiving the HTTP response, the web browser 102 displays the webpage corresponding to the photo albums or digital images that the user 86 is permitted to view.

If a username and/or password are required, the peer software 90 and the web server 92 may operate to provide a log-in webpage in response to the initial request from the guest node 80. Upon receiving the username and/or password from the user 86, the peer software 90 may determine the permissions assigned to the user 86, identify the photo albums or digital images that the user 86 is permitted to view, and provide an HTTP request for the photo albums or digital images that the user 86 is permitted to view to the web server 92. In response, the web server 92 provides an HTTP response including the photo albums or digital images that the user 86 is permitted to view. The HTTP response is provided to the guest node via the peer software 90 and the proxy 98, as described above.

While the P2P photosharing system 72 of FIG. 7 maintains the permissions database 96 at the peer node 74, the central node 78 may alternatively maintain a permissions database for each of the peer nodes 74 and 76 in the P2P photosharing system 72. In this alternative embodiment, the peer nodes 74 and 76 may provide the guest lists and the permissions for the guests in the guest lists to the central node 78 where they are stored. When a request from the guest node 80 is received at the central node 78, the central node 78 may determine the permissions of the user 86 and send a request to the peer node 74 for the photo albums or digital images that the user 86 is permitted to view. For example, the request may include the permissions assigned to the user 86. Upon receiving the request, the peer node 74 identifies the photo albums and digital images that the user 86 is permitted to view and provides the identified photo albums and digital images to the central node 78.

Figure 8:
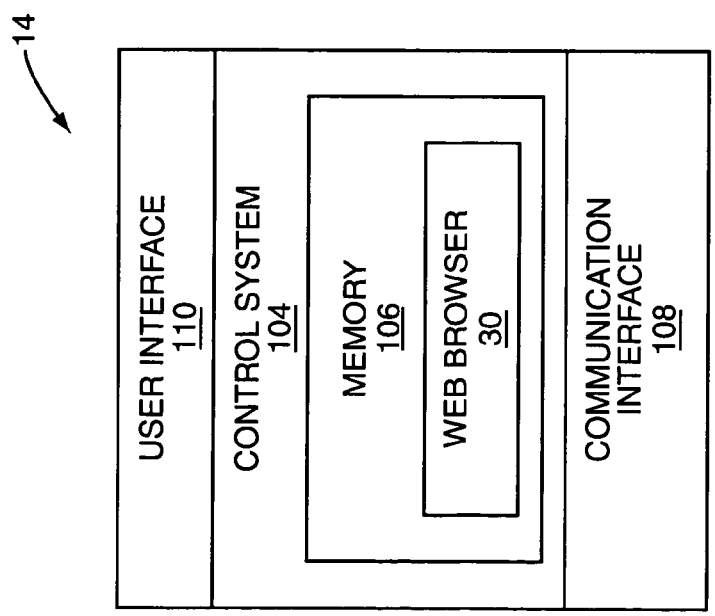
FIG. 8 is a block diagram of an exemplary embodiment of the owner node of the system of FIG. 1.

FIG. 8 is a block diagram of an exemplary embodiment of the owner node 14 of FIG. 1. This discussion of the owner node 14 is equally applicable to the guest node 16 of FIG. 1. The owner node 14 may generally include a control system 104 having associated memory 106. The memory 106 may store the web browser 30. The owner node 14 also includes a communication interface 108 for communicating with other network entities via the network 22. The communication interface 108 may also include an interface to various external devices such as a printer. The owner node 14 also includes a user interface 110, which may include a keypad, mouse, display, and the like (not shown).

Figure 9:
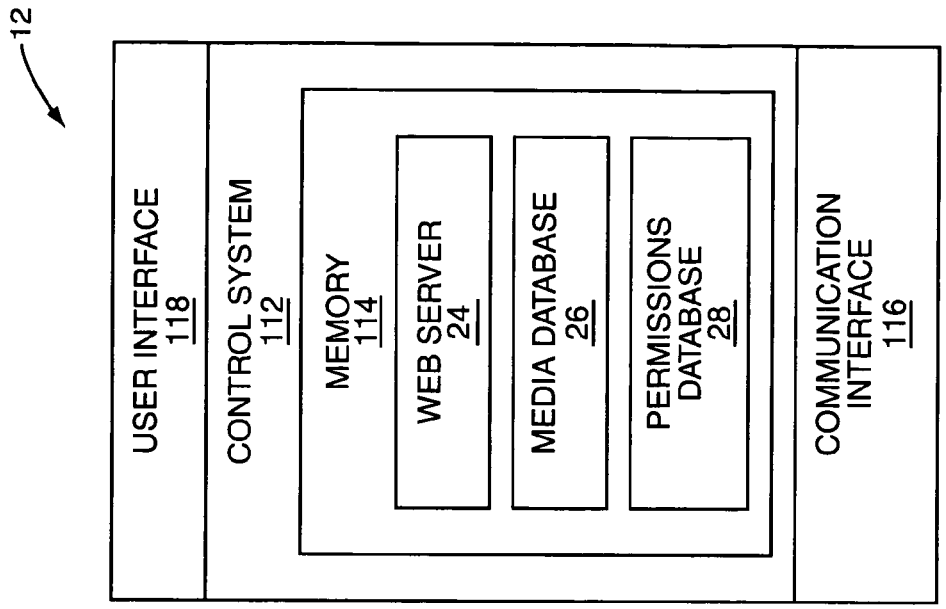
FIG. 9 is a block diagram of an exemplary embodiment of the central node of the system of FIG. 1.

FIG. 9 is a block diagram of an exemplary embodiment of the central node 12, which may include a control system 112 having associated memory 114. The memory 114 may store the web server 24, the media database 26, and the permissions database 28. In this example, the web server 24 is implemented in software. However, the web server 24 be implemented in hardware and/or software. In addition, while the media database 26 and the permissions database 28 are illustrated as being stored in the memory 114, they may alternatively be stored in a storage device such as a hard disc drive. The central node 12 also includes a communication interface 116 for communicating with other network entities via the network 22. The communication interface 116 may also include an interface to various external devices such as a printer. The central node 12 may also include a user interface 118, which may include a keypad, mouse, display, and the like (not shown).

FIG. 10 is a block diagram of an exemplary embodiment of the peer node 74, which may include a control system 120 having associated memory 122. The memory 122 may store the peer software 90, the web server 92, the media database 94, and the permissions database 96. In this example, the web server 92 is implemented in software. However, the web server 92 be implemented in hardware and/or software. In addition, while the media database 94 and the permissions database 96 are illustrated as being stored in the memory 122, they may alternatively be stored in a storage device such as a hard disc drive. The peer node 74 also includes a communication interface 124 for communicating with other network entities via the network 88. The communication interface 124 may also include an interface to various external devices such as a printer. The peer node 74 also includes a user interface 126, which may include a keypad, mouse, display, and the like (not shown).

FIG. 11 is a block diagram of an exemplary embodiment of the central node 78, which may include a control system 128 having associated memory 130. The memory 130 may store the proxy 98 and the socket connection table 100. In this example, the proxy 98 is implemented in software. However, the proxy 98 may be implemented in hardware and/or software. In addition, while the socket connection table 100 is illustrated as being stored in the memory 130, it may alternatively be stored in a storage device such as a hard disc drive. The central node 78 also includes a communication interface 132 for communicating with other network entities via the network 88. The communication interface 132 may also include an interface to various external devices such as a printer. The central node 78 may also include a user interface 134, which may include a keypad, mouse, display, and the like (not shown).

Those skilled in the art will recognize improvements and modifications to the preferred embodiments of the present invention. All such improvements and modifications are considered within the scope of the concepts disclosed herein and the claims that follow.

What is claimed is:

1. A method performed by a computer processor for controlling access to digital assets in an online media sharing system comprising:
    tagging, via the computer processor, each of a plurality of digital assets with a corresponding at least one of a plurality of keywords, wherein each of the at least one of the plurality of keywords relates to at least one attribute of the digital asset;
    defining, via the computer processor, a guest list including a plurality of guests; and
    for each of the plurality of guests, assigning permissions, via the computer processor, by selecting at least one select keyword from the plurality of keywords such that the ones of the plurality of digital assets that the guest is permitted to access are ones of the plurality of digital assets tagged with the at least one select keyword;
    receiving a request from one of the plurality of guests at a guest node; and
    providing the ones of the plurality of digital assets that the one of the plurality of guests is permitted to access to the guest node, wherein the plurality of keywords comprises at least one dynamic keyword and the permissions for the one of the plurality of guests is defined, at least in part, based on one of the at least one dynamic keyword, wherein providing the ones of the plurality of digital assets that the one of the plurality of guests is permitted to access comprises determining a state of the one of the at least one dynamic keyword based on a weather condition determined at a time of access by the one of the plurality of guests.

2. The method of claim 1 wherein the plurality of digital assets comprises a plurality of photo albums each comprising a plurality of digital images.

3. The method of claim 2 wherein tagging each of the plurality of digital assets comprises tagging each of the plurality of photo albums with at least one of the plurality of keywords.

4. The method of claim 2 wherein tagging each of the plurality of digital assets comprises tagging each of the plurality of digital images within each of the plurality of photo albums with at least one of the plurality of keywords.

5. The method of claim 1 wherein the plurality of digital assets comprises a plurality of digital images.

6. The method of claim 1 wherein the plurality of digital assets comprises at least one of a group consisting of: a plurality of photo albums each comprising a plurality of digital images, a plurality of digital images, and a plurality of digital videos.

7. The method of claim 1 wherein for each of the plurality of guests, assigning the permissions further comprises defining a keyword equation such that the ones of the plurality of digital assets that the guest is permitted to access are ones of the plurality of digital assets tagged with keywords satisfying the keyword equation.

8. The method of claim 1 wherein the plurality of keywords comprises at least one dynamic keyword.

9. The method of claim 1 wherein providing the ones of the plurality of digital assets that the one of the plurality of guests is permitted to access comprises determining the state of the one of the at least one dynamic keyword based on a date determined at the time of access by the one of the plurality of guests.

10. A computer processing node for an online media sharing system comprising:
    a) a communication interface adapted to couple the computer processing node to a network; and
    b) a control system comprising a processor and associated with the communication interface and adapted to:
        i) store a plurality of digital assets associated with an owner in a media database, each of the plurality of digital assets tagged with a corresponding at least one of a plurality of keywords, wherein each of the at least one of the plurality of keywords relates to at least one attribute of the digital asset;
        ii) obtain a guest list including a plurality of guests from the owner;

iii) for each of the plurality of guests, obtain permissions which identify at least one select keyword from the plurality of keywords such that the ones of the plurality of digital assets that the guest is permitted to access are ones of the plurality of digital assets tagged with the at least one select keyword;

iv) store the permissions for the plurality of guests;

v) receive a request from one of the plurality of guests at a guest node; and vi) provide the ones of the plurality of digital assets that the one of the plurality of guests is permitted to access to the guest node, wherein the plurality of keywords comprises at least one dynamic keyword and the permissions for the one of the plurality of guests is defined, at least in part, based on one of the at least one dynamic keyword, the control system is further adapted to identify the ones of the plurality of digital assets that the one of the plurality of guests is permitted to access based on, at least in part, determining a state of the one of the at least one dynamic keyword based on a weather condition determined at a time of access by the one of the plurality of guests.

11. The computer processing node of claim 10 wherein the plurality of digital assets comprises a plurality of photo albums each comprising a plurality of digital images.

12. The computer processing node of claim 11 wherein each of the plurality of photo albums are tagged with the at least one of the plurality of keywords.

13. The computer processing node of claim 11 wherein, for each of the plurality of photo albums, the plurality of digital images within the photo album are tagged with the at least one of the plurality of keywords.

14. The computer processing node of claim 10 wherein the plurality of digital assets comprises a plurality of digital images.

15. The computer processing node of claim 10 wherein the plurality of digital assets comprises at least one of a group consisting of: a plurality of photo albums each comprising a plurality of digital images, a plurality of digital images, and a plurality of digital videos.

16. The computer processing node of claim 10 wherein for each of the plurality of guests, the permissions further comprise a keyword equation and the ones of the plurality of digital assets that the guest is permitted to access are ones of the plurality of digital assets tagged with keywords satisfying the keyword equation.

17. The computer processing node of claim 10 wherein the plurality of keywords comprise at least one dynamic keyword.

18. The computer processing node of claim 10, the control system is further adapted to identify the ones of the plurality of digital assets that the one of the plurality of guests is permitted to access based on, at least in part, determining the state of the one of the at least one dynamic keyword based on a date determined at the time of access by the one of the plurality of guests.

* * * * *